US011626108B2

(12) United States Patent
Nair et al.

(10) Patent No.: US 11,626,108 B2
(45) Date of Patent: Apr. 11, 2023

(54) MACHINE LEARNING SYSTEM FOR CUSTOMER UTTERANCE INTENT PREDICTION

(71) Applicant: TD Ameritrade IP Company, Inc., Omaha, NE (US)

(72) Inventors: Abhilash Krishnankutty Nair, Ann Arbor, MI (US); Amaris Yuseon Sim, Ann Arbor, MI (US); Dayanand Narregudem, Ann Arbor, MI (US); Drew David Riassetto, Valley Park, MO (US); Logan Sommers Ahlstrom, Ann Arbor, MI (US); Nafiseh Saberian, Ann Arbor, MI (US); Stephen Filios, Canton, MI (US); Ravindra Reddy Tappeta Venkata, Novi, MI (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 17/033,608

(22) Filed: Sep. 25, 2020

(65) Prior Publication Data
US 2022/0101837 A1 Mar. 31, 2022

(51) Int. Cl.
*G10L 15/18* (2013.01)
*G06Q 30/02* (2023.01)
(Continued)

(52) U.S. Cl.
CPC .......... *G10L 15/1822* (2013.01); *G06F 40/30* (2020.01); *G06Q 30/0281* (2013.01);
(Continued)

(58) Field of Classification Search
CPC .......................... G10L 15/1822; G10L 15/22
See application file for complete search history.

(56) References Cited

U.S. PATENT DOCUMENTS 7,487,095 B2 * 2/2009 Hill ...................... G10L 15/1822
704/275
10,229,370 B1 * 3/2019 Merritt ................ H04M 3/4365
(Continued)

OTHER PUBLICATIONS

Cer, Daniel, et al. "Universal sentence encoder." arXiv preprint arXiv:1803.11175 (2018). (Year: 2018).*

*Primary Examiner* — Shaun Roberts
(74) *Attorney, Agent, or Firm* — Harness, Dickey & Pierce P.L.C.

(57) ABSTRACT

A method of operating a customer utterance analysis system includes obtaining a subset of utterances from among a first set of utterances. The method includes encoding, by a sentence encoder, the subset of utterances into multi-dimensional vectors. The method includes generating reduced-dimensionality vectors by reducing a dimensionality of the multi-dimensional vectors. Each vector of the reduced-dimensionality vectors corresponds to an utterance from among the subset of utterances. The method includes performing clustering on the reduced-dimensionality vectors. The method includes, based on the clustering performed on the reduced-dimensionality vectors, arranging the subset of utterances into clusters. The method includes obtaining labels for a least two clusters from among the clusters. The method includes generating training data based on the obtained labels. The method includes training a neural network model to predict an intent of an utterance based on the training data.

22 Claims, 7 Drawing Sheets

(51) Int. Cl.
*G10L 15/14* (2006.01)
*G10L 15/16* (2006.01)
*G06F 40/30* (2020.01)
*G06F 16/9032* (2019.01)

(52) U.S. Cl.
CPC .............. *G10L 15/14* (2013.01); *G10L 15/16* (2013.01); *G06F 16/90332* (2019.01)

(56) References Cited

U.S. PATENT DOCUMENTS

| | | | | |
|---|---|---|---|---|
| 10,380,516 | B1* | 8/2019 | Kislaki | G06Q 10/063112 |
| 10,805,465 | B1* | 10/2020 | Krebs | G06F 40/279 |
| 11,062,704 | B1* | 7/2021 | Kodish-Wachs | G06F 40/30 |
| 2015/0339288 | A1* | 11/2015 | Baker | G06F 40/205 |
| | | | | 704/9 |
| 2016/0110343 | A1* | 4/2016 | Kumar Rangarajan Sridhar | G06F 40/30 |
| | | | | 704/9 |
| 2016/0189558 | A1* | 6/2016 | McGann | G09B 5/06 |
| | | | | 434/219 |
| 2017/0316438 | A1* | 11/2017 | Konig | G06Q 30/0204 |
| 2018/0268298 | A1* | 9/2018 | Johansen | G06F 40/30 |
| 2018/0293499 | A1* | 10/2018 | He | G06F 40/289 |
| 2019/0228312 | A1* | 7/2019 | Andoni | G06F 17/18 |
| 2019/0237068 | A1* | 8/2019 | Canim | G10L 15/22 |
| 2020/0074312 | A1* | 3/2020 | Liang | G06F 40/30 |
| 2020/0336567 | A1* | 10/2020 | Dumaine | H04L 67/02 |
| 2021/0021621 | A1* | 1/2021 | Janakiraman | H04L 43/045 |
| 2021/0027783 | A1* | 1/2021 | Szymanski | G06N 3/0445 |
| 2021/0056385 | A1* | 2/2021 | Mane | G06N 3/0427 |
| 2021/0103634 | A1* | 4/2021 | Gkikas | G06F 40/186 |
| 2021/0142791 | A1* | 5/2021 | Penta | G06N 5/022 |
| 2021/0157577 | A1* | 5/2021 | Sobran | G06F 8/73 |
| 2021/0216577 | A1* | 7/2021 | Xiao | G06F 16/3329 |
| 2021/0303970 | A1* | 9/2021 | Ma | G06N 3/084 |

\* cited by examiner

FIG. 1

| | Utterance |
|---|---|
| U1 | "How do I access my profile from the webpage" |
| U2 | "How do I get the webpage to save my login info?" |
| U3 | "I want to calculate my RMD for this year" |
| U4 | "Can you do my RMD calc?" |
| U5 | "Do I have to tak out an RMD for a bene IRA?" |
| U6 | "What is an RMD?" |
| U7 | "I enterered the wrong password a few times and the webpage locked me out" |
| U8 | "How do I update my profile?" |
| U9 | "I forgot my login info" |
| ... | |
| Un | "How can I help?" |

130

| | Utterance | Topic Pair Tag |
|---|---|---|
| U1 | "How do I access my profile from the webpage" | Webpage/profile |
| U2 | "How do I get the webpage to save my login info?" | Webpage/login |
| U3 | "I want to calculate my RMD for this year" | Retirement/RMD |
| U4 | "Can you do my RMD calc?" | Retirement/RMD |
| U5 | "Do I have to tak out an RMD for a bene IRA?" | Retirement/RMD |
| U6 | "What is an RMD?" | Retirement/RMD |
| U7 | "I enterered the wrong password a few times and the webpage locked me out" | Webpage/login |
| U8 | "How do I update my profile?" | Webpage/profile |
| U9 | "I forgot my login info" | Webpage/login |
| ... | | |
| Un | "How can I help?" | Retirement/RMD |

U3: "I want to calculate my RMD for this year"
L0: Help calculating RMD

U4: "Can you do my RMD calc?"
L0: Help calculating RMD

U5: "Do I have to take out an RMD for a bene IRA"
L1: Help with beneficiary IRAs U6: "What is an RMD?"
L2: General RMD Questions

*FIG. 7A*

U3: "I want to calculate my RMD for this year" — 705

| Utterance Input Layer | — 710 |
| Universal Sentence Encoder as Trainable Layer | — 720 |
| Dropout Layer | — 730 |
| Hidden Dense Layer | — 740 | } 722
| Dropout Layer | — 750 |
| Hidden Dense Layer | — 760 | } 724
| Dropout Layer | — 770 |
| Softmax Layer That Outputs Classification | — 780 |

PV0-3: L0 probability value for U3
PV1-3: L1 probability value for U3
PV2-3: L2 probability value for U3

*FIG. 7B*

MACHINE LEARNING SYSTEM FOR CUSTOMER UTTERANCE INTENT PREDICTION

FIELD

The present disclosure relates to large-scale data processing and more particularly to predicting intent from user communications.

BACKGROUND

A call center for a large company may receive as many as tens of thousands of calls daily from customers. In addition, such a company may receive millions of communications daily from customers including, for example, texts, chat app conversations, and emails. Each communication may include valuable information that the company can use to improve the quality of service experienced by its customers. When the aggregate quality of service experienced by the customers is improved, the company may retain more existing customers and attract more new customers thus resulting in an overall benefit to the performance of the company.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to at least some example embodiments, a method of operating a customer utterance analysis system includes obtaining a subset of utterances from among a first plurality of utterances; encoding, by a sentence encoder, the subset of utterances into a plurality of multi-dimensional vectors; generating a plurality of reduced-dimensionality vectors by reducing a dimensionality of the plurality of multi-dimensional vectors, each vector from among the plurality of reduced-dimensionality vectors corresponding to a utterance from among the subset of utterances; performing clustering on the plurality of reduced-dimensionality vectors; based on the clustering performed on the reduced-dimensionality vectors, arranging the subset of utterances into a plurality of clusters; obtaining labels for a least two clusters from among the plurality of clusters; generating training data based on the obtained labels; and training a neural network model to predict an intent of an utterance based on the training data.

The first plurality of utterances may be utterances, from among a second plurality of utterances, that have been tagged with a first topic from among a plurality of topic.

The method may further include collecting the second plurality of utterances from communications received by the customer utterance analysis system from customers.

The plurality of multi-dimensional vectors may be j-dimensional vectors and the plurality of reduced-dimensionality vectors may be k-dimensional vectors, k being a positive integer greater than 2 and j being a positive integer greater than k.

The plurality of utterances may be utterances from at least one of phone conversations, electronic or paper forms, electronic or paper surveys, chat app communications, or emails.

The reducing of the dimensionality of the plurality of multi-dimensional vectors may include using uniform manifold approximation and projection (UMAP) to reduce the dimensionality of the plurality of multi-dimensional vectors.

The performing of the clustering on the plurality of reduced-dimensionality vectors may include using the hierarchical density-based spatial clustering of applications with noise (HDBSCAN) data clustering algorithm to perform the clustering on the plurality of reduced-dimensionality vectors.

The generating of the training data may include, for each cluster from among the at least two clusters for which labels were obtained, coupling the label of the cluster to each utterance included in the cluster.

The neural network model may include an encoder layer and the encoder layer may include GOOGLE's Universal Sentence Encoder, and the training of the neural network model may include setting the Universal Sentence Encoder to be trainable.

According to at least some example embodiments, a computer system includes memory storing computer-executable instructions and a processor configured to execute the computer-executable instructions, wherein the computer-executable instructions include obtaining a subset of utterances from among a first plurality of utterances; encoding, by a sentence encoder, the subset of utterances into a plurality of multi-dimensional vectors; generating a plurality of reduced-dimensionality vectors by reducing a dimensionality of the plurality of multi-dimensional vectors, each vector from among the plurality of reduced-dimensionality vectors corresponding to a utterance from among the subset of utterances; performing clustering on the plurality of reduced-dimensionality vectors; based on the clustering performed on the reduced-dimensionality vectors, arranging the subset of utterances into a plurality of clusters; obtaining labels for a least two clusters from among the plurality of clusters; generating training data based on the obtained labels; and training a neural network model to predict an intent of an utterance based on the training data.

The first plurality of utterances may be utterances, from among a second plurality of utterances, that have been tagged with a first topic from among a plurality of topic.

The computer-executable instructions include collecting the second plurality of utterances from communications received from customers.

The plurality of multi-dimensional vectors are j-dimensional vectors; the plurality of reduced-dimensionality vectors are k-dimensional vectors; k is a positive integer greater than 2; and j is a positive integer greater than k.

The first plurality of utterances may be utterances from at least one of phone conversations, electronic or paper forms, electronic or paper surveys, chat app communications, or emails.

The reducing of the dimensionality of the plurality of multi-dimensional vectors may include using uniform manifold approximation and projection (UMAP) to reduce the dimensionality of the plurality of multi-dimensional vectors.

The performing of the clustering on the plurality of reduced-dimensionality vectors may include using the hierarchical density-based spatial clustering of applications with noise (HDBSCAN) data clustering algorithm to perform the clustering on the plurality of reduced-dimensionality vectors.

The generating of the training data may include, for each cluster from among the at least two clusters for which labels were obtained, coupling the label of the cluster to each utterance included in the cluster.

The neural network model may include an encoder layer and the encoder layer may include GOOGLE's Universal Sentence Encoder and the training of the neural network model may include setting the Universal Sentence Encoder to be trainable.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
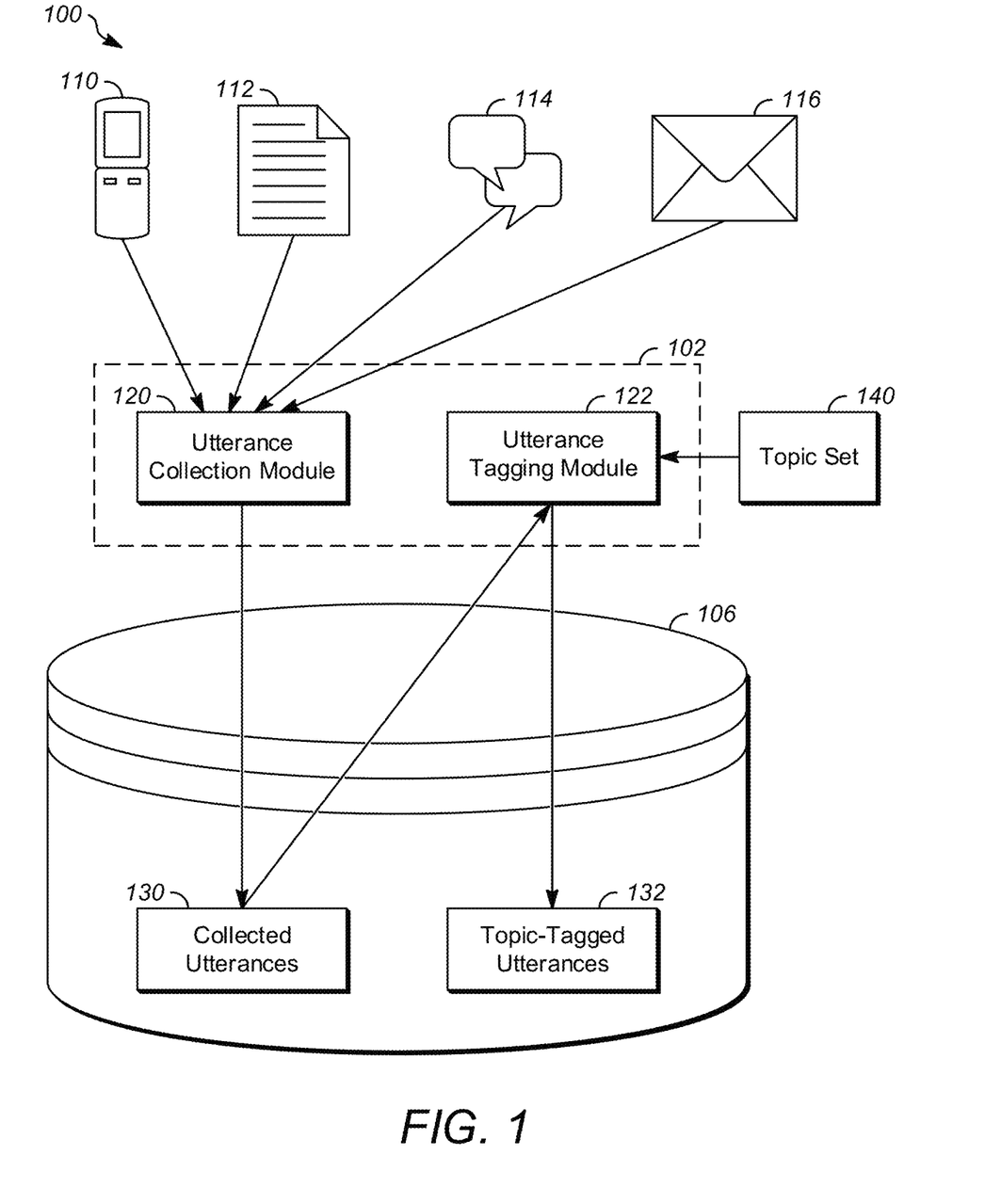
FIG. 1 is a diagram illustrating a customer utterance analysis system according to principles of the present disclosure.

FIG. 1 is a diagram illustrating a first customer utterance analysis system 100 according to principles of the present disclosure. The first customer utterance analysis system 100 may include an utterance analysis architecture 102 and a customer utterance database (DB) 106. According to at least some example embodiments, the utterance analysis architecture 102 (and an utterance analysis architecture 202, which is discussed in greater detail below with reference to FIG. 3) may include or be implemented by one or more circuits or circuitry (e.g., hardware) specifically structured to carry out and/or control some or all of the operations described in the present disclosure as being performed by a customer utterance analysis architecture (or an element thereof). According to at least one example embodiment, the utterance analysis architecture 102 (and the second customer utterance analysis architecture 202 which is discussed in greater detail below with reference to FIG. 3) may include or be implemented by a memory and one or more processors executing computer-readable code (e.g., software and/or firmware) that is stored in the memory and includes instructions for causing the one or more processors to carry out and/or control some or all of the operations described in the present disclosure as being performed by a customer utterance analysis architecture (or an element thereof). According to at least some example embodiments, the utterance analysis architecture 102 (and the second customer utterance analysis architecture 202 which is discussed in greater detail below with reference to FIG. 3) may be or include a network of processing nodes (e.g., laptops, desktop computers, servers, etc.) configured to work together, in parallel, to carry out and/or control some or all of the operations described in the present disclosure as being performed by a customer utterance analysis architecture (or an element thereof), for example, in accordance with instructions included in computer-readable code stored in memory accessible by one or more nodes from among the network of processing nodes.

The utterance analysis architecture 102 may include an utterance collection module 120 and an utterance tagging module 122. As is discussed in greater detail below, the utterance analysis architecture 102 may receive communications from customers, obtain utterances from the received communications, perform various processing on the utterances, and store and retrieve utterance data to and from the DB 106. According to at least some example embodiments, the DB 106 is an enterprise data warehouse (EDW) DB.

Figure 2:
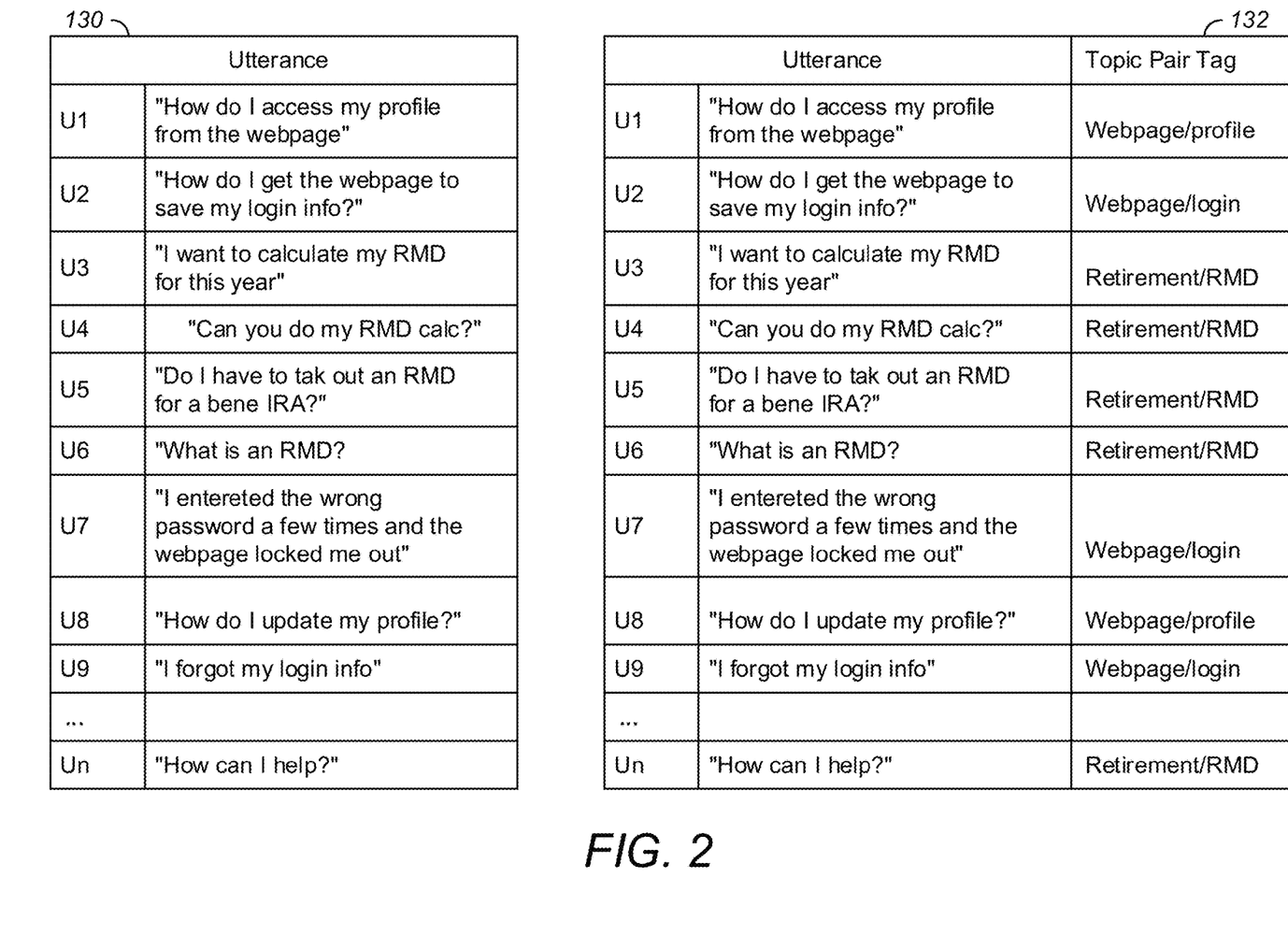
FIG. 2 is a diagram illustrating various types of customer utterance data according to principles of the present disclosure.

A company associated with the first customer utterance analysis system 100 may receive many different types of communications from many customers. As illustrated in FIG. 1, examples of types of communications that may be received by the company include, but are not limited to, phone conversations 110, electronic or paper forms or surveys 112, chat app communications 114, and emails 116. Other, examples of types of communications that may be received by the company, which are not illustrated in FIG. 1, include, but are not limited to faxes, and letters or other paper missives sent from a customer via a mail delivery service. As used in the present specification, the term "customer" is not limited to people or entities with an active business relationship with the company (i.e., current customers), and thus may refer to any of former customers, potential and customers current customers. According to at least some example embodiments, the utterance collection module 120 may obtain the utterances from the received communications, for example, in accordance with known voice of the customer analysis (VoCA) techniques. According to at least some example embodiments, the utterance collection module 120 stores the obtained utterances as collected utterances 130 in the DB 106. FIG. 2 is a diagram illustrating various types of customer utterance data according to principles of the present disclosure. As is illustrated in FIG. 2, the collected utterances 130 may include utterances U1-Un.

A single communication from a customer may include multiple utterances. As used in the present specification, the term "utterance" refers to a combination of expression elements (e.g., words, numbers, punctuation and/or other symbols) in a communication that, together, form all or part of an expression (e.g., a thought, assertion, question, etc.). The aforementioned combination of expression elements is generally a contiguous set of expression elements that is included in the communication. Accordingly the company associated with the first customer utterance analysis system 100 can easily receive tens of thousands of communications and hundreds of thousands of utterances on a daily basis, depending on a size of the company. Over longer periods of time, up to millions, or even hundreds of millions or more, of utterances may be obtained by the utterance collection module 120 and stored in the database as the collected utterances 130. Do to the unwieldy size of the massive set of utterances that may be included in the stored collected utterances 130, the substantial amount of valuable customer information therein may be difficult to access. A topic tagging process that helps to organize and identify large numbers of utterances will now be discussed below.

Topic Tagging

In order to make the stored collected utterances 130 easier to analyze, the utterance tagging module 122 analyzes the collected utterances 130, tags each utterance with a topic, and stores the utterances in DB 106 as topic-tagged utterances 132. FIG. 2 illustrates an examples of the topic-tagged utterances 132. As is illustrated in FIG. 2, the topic-tagged utterances 132 may include the utterances U1-Un, each of which is tagged with a topic, where n is a positive integer which may have a value in the millions, or even hundreds of millions or more, depending on a number of communications received from customers at the company associated with the first customer utterance analysis system 100.

According to at least some example embodiments, the topics used by the utterance tagging module 122 come from a set of topics (which may also be referred to as a "topic set"). For example, the topic set may be determined off-line by people who are subject matter experts in the filed(s) in which the company associated with the first customer utterance analysis system 100 operates. According to at least some example embodiments, the topic set is structured in the form of major topics and minor topics. Specifically, each major topic in the topic set may be associated with plurality of minor topics. Accordingly, each minor topic is part of a unique major-minor topic pair (i.e., a pair including the minor topic and the major topic associated with the minor topic) within the topic set. For example, the example contents of the topic-tagged utterances 132 illustrated in FIG. 2 includes the following major-minor topic pairs: Webpage/profile; Webpage/login; and Retirement/RMD. Thus, in the example shown by FIG. 2, "Webpage" and "Retirement" are examples of major topics and "profile" and required minimum distribution ("RMD") are examples of minor topics. For the purpose of simplicity, in the present specification, a major-minor topic pair may be referred to, on occasion, as a "topic."

According to at least some example embodiments, the utterance tagging module 122 may use query-based techniques in order to tag utterances with a topic from among the topic set. The query-based techniques may include posing at least one or more queries, from among a series of queries, regarding attributes of utterances, and assigning each utterance to a major-minor topic pair based on the answers to the at least one or more queries with respect to the utterance being assigned.

Accordingly, the topic-tagged utterances 132 may be used to analyze, for example, high-level information such the utterances of utterances, from among the collected utterances 130, that are associated with each topic from among the topic set 140.

However, for topic-tagged utterances associated with a single topic from topic set 140, the intent of each utterance (e.g., the reason behind the user making the utterance) may sometimes remain ambiguous. If an intent could be predicted for each topic-tagged utterance, than the topic-tagged utterances would be amenable to deeper forms of analysis and richer customer information which could be more useful to the company associated with the first customer utterance analysis system 100. Methods of predicting the intent of an utterance according to principles of the present disclosure will now be discussed in greater detail below with reference to FIGS. 3-8.

Utterance Intent Prediction

Intents of topic-tagged utterances could be used by the company associated with the first customer utterance analysis system 100 to detect customer information including, for example, desires, concerns and/or preferences of the company's customers in aggregate, as well as the relative prevalence of the desires, concerns and/or preferences. Such customer information could be used by the company to improve the overall quality of service experienced by the customers. However, the process of manually determining a plurality of potential intents for each topic among the topic set 140 would be difficult and time consuming.

For example, it may be difficult for a person or a group of people to know whether a set of potential intents they determined manually for a particular topic, from among the topic set 140, is adequately representative of the many utterances tagged with that particular topic. Further, it may be difficult for a person or a group of people to know when the set of potential intents they determined manually is complete. Further, any manual method of determining a set of potential intents may have at least two additional issues: (i) that method would need to be performed for each of the (potentially dozens or hundreds) of topics in the topic set 140; and (ii) in order to use query-based techniques to assign, to each utterance, a potential intent as the predicted intent of the utterance, a series of queries robust enough to address every individual potential intent associated with every topic from the topic set 140 would need to be developed. Issues (i) and (ii), above, may make manual determination of sets of potential intents and query-based techniques for assigning potential intents to utterances infeasible if not impossible.

Figure 3:
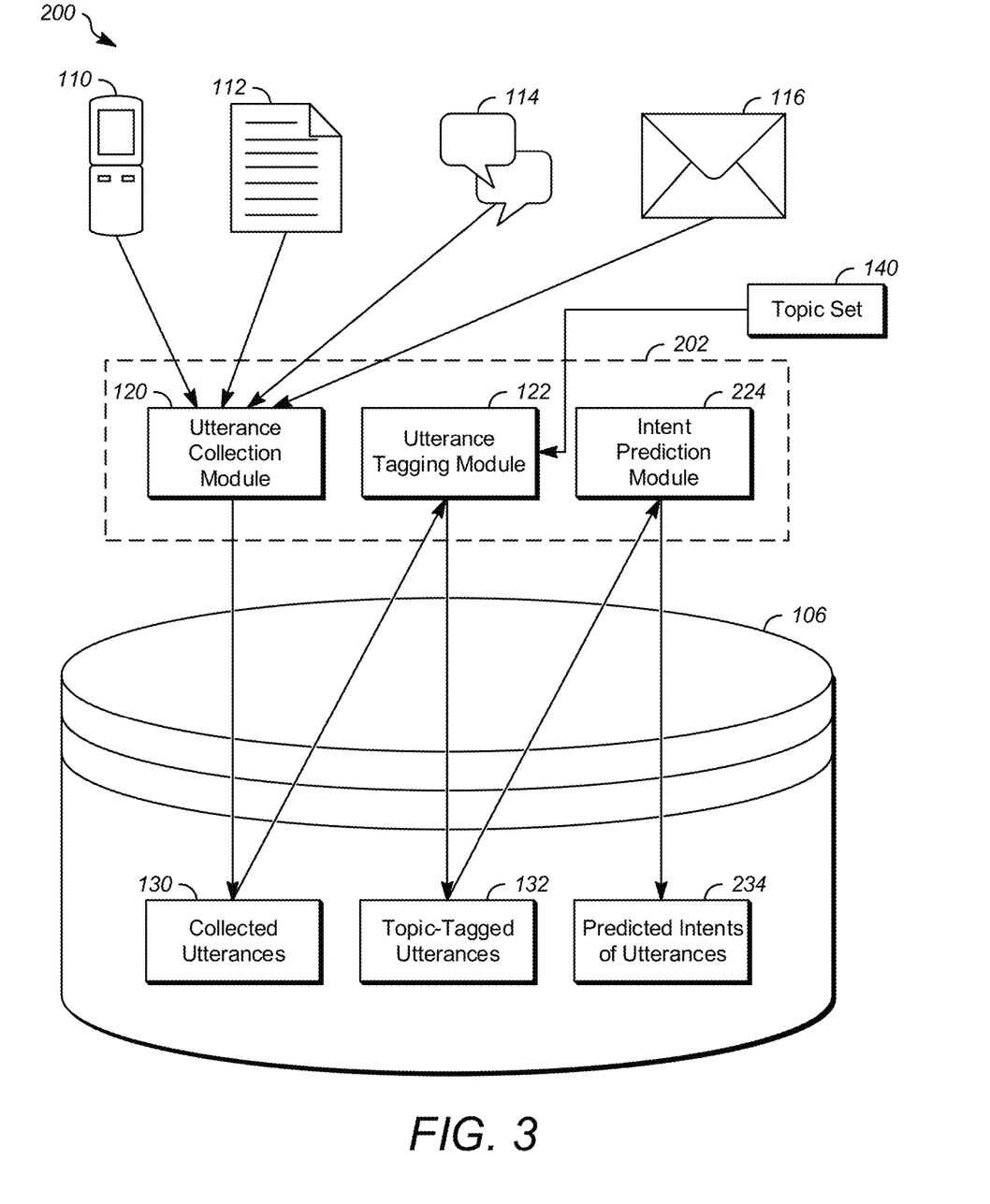
FIG. 3 is a diagram illustrating another customer utterance analysis system according to principles of the present disclosure.

Thus, according to at least some example embodiments, machine-leaning based techniques are used to perform utterance intent predication. For example, FIG. 3 is a diagram illustrating a second customer utterance analysis system 200 according to principles of the present disclosure. The structure of the second customer utterance analysis system 200 is similar to that of the first customer utterance analysis system 100 of FIG. 1. Accordingly, for the purpose of simplicity, descriptions of like elements are omitted from the description of the second customer utterance analysis system 200. According to at least some example embodiments, relative to the first customer utterance analysis system 100 of FIG. 1, the second customer utterance analysis system 200 includes the second customer utterance analysis architecture 202 instead of the utterance analysis architecture 102. Further, the structure of the second customer utterance analysis architecture 202 is similar to that of the utterance analysis architecture 102 of FIG. 1. For example, relative to the utterance analysis architecture 102 of FIG. 1, the second customer utterance analysis architecture 202 additionally includes an intent prediction module 224.

Figure 4:
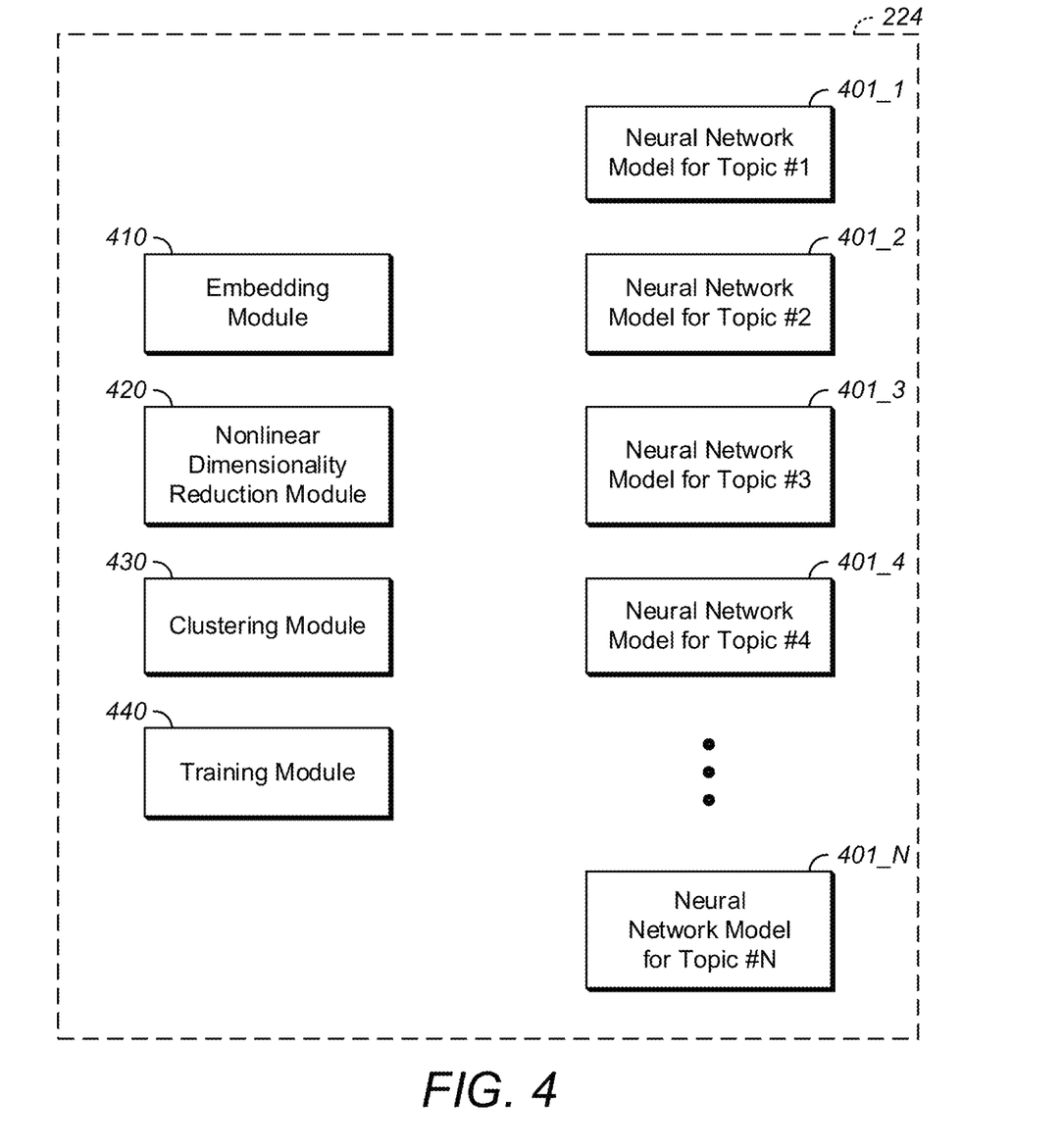
FIG. 4 is a diagram illustrating an intent prediction module according to principles of the present disclosure.

FIG. 4 is a diagram illustrating the intent prediction module 224 according to principles of the present disclosure. As is illustrated in FIG. 4, the intent prediction module 224 may include a plurality of trained neural network models 401. Further, the intent prediction module 224 may include an embedding module, a nonlinear dimensionality reduction module 420, and a clustering module 430, each of which will be discussed in greater detail below with reference to FIG. 5.

Returning to FIG. 4, the plurality of trained neural network model includes first through Nth neural network models 401_1-401_N, each of which corresponds to one of Topic #1-Topic #N from among the topic set 140. For example, in the example illustrated in FIG. 4, the trained neural network model corresponding to a Topic #x is denoted by the reference numeral 401_x (e.g., trained neural network models 401_1 and 401_2 correspond to Topic #1 and Topic #2, respectively). Thus, according to at least some example embodiments, the intent prediction module 224 includes a trained neural network model for each major-minor topic pair within the topic set 140. Referring to FIGS. 3 and 4, the intent prediction module 224 may obtain utterances from among the topic-tagged utterances 132, determine predicted intents of the obtained utterances (i.e., using the trained neural network models that correspond to the topics with which each obtained utterance is tagged), and store the determined intents in the DB 106 as predicted intents of utterances 234.

According to at least some example embodiments, there are two machine-learning based phases in the process of obtaining the trained neural network models 401:

(A) Labeling phase—e.g., arranging utterances into clusters and assigning intents to the clusters as labels; and
(B) Training phase—e.g., generating training data based on the labels assigned in the labeling phase, and using supervised learning to train neural network models based on the generated training data.

The labeling phase will be discussed in greater detail below with reference to FIG. 5, and the training phase will be discussed in greater detail below with reference to FIGS. 6-8.

Labeling Phase

Figure 5:
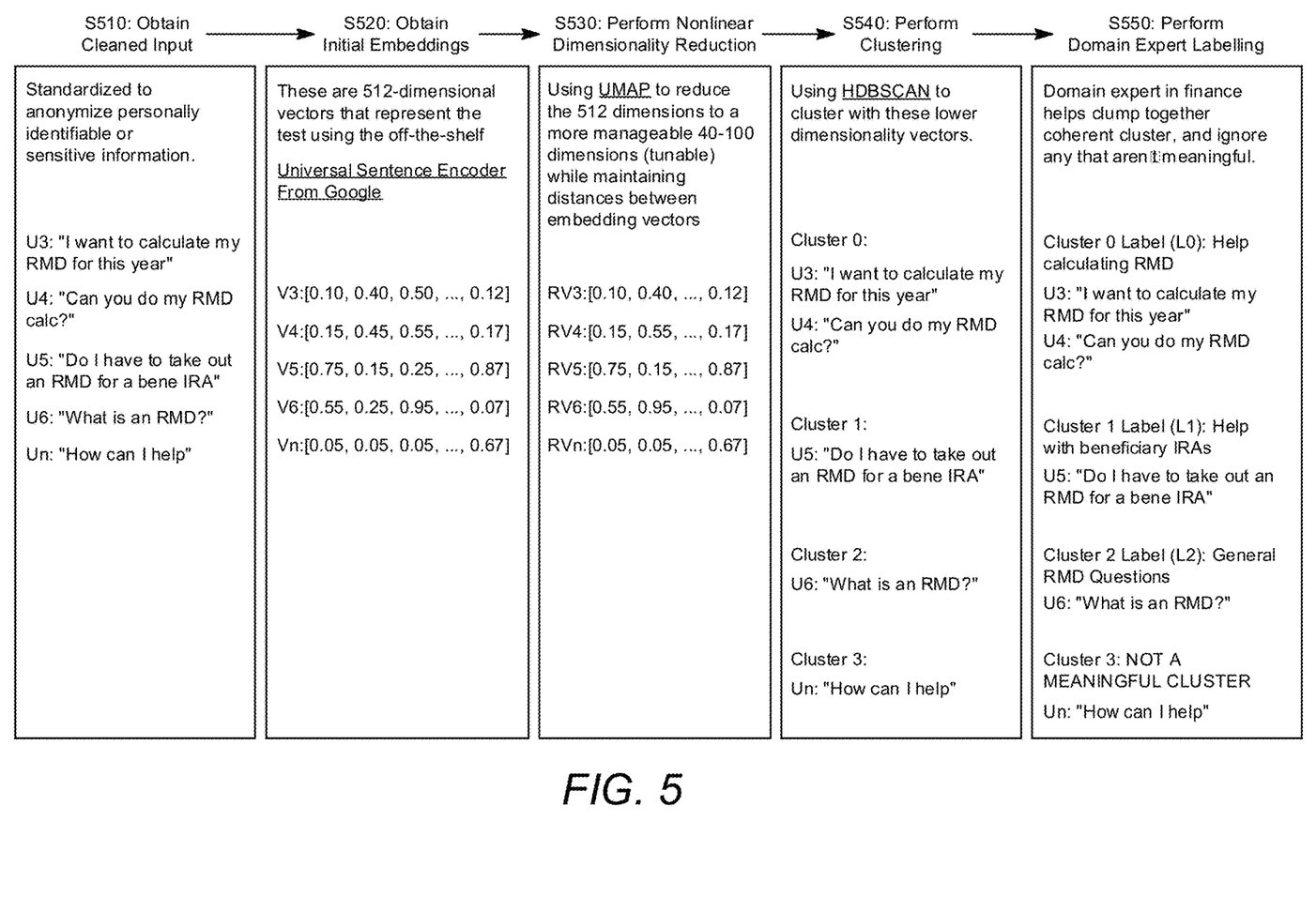
FIG. 5 is a flowchart of an utterance labeling process according to principles of the present disclosure.

FIG. 5 is a flowchart of an utterance labeling process according to principles of the present disclosure. Referring to FIG. 5, in step S510 cleaned input is obtained. As is discussed in According to at least some example embodiments, cleaned input refers to utterances that have been standardized to anonymize personally identifiable of sensitive information. According to at least some example embodiments, utterances may be cleaned prior to being obtained by the intent prediction module 224 (e.g., by the utterance collection module 120 or the utterance tagging module 122 or a process performed outside the second customer utterance analysis architecture 202). Thus, according to at least some example embodiments, in step S510, the intent prediction module 224 obtains utterances by selecting a subset of utterances from among the larger set of utterances, within the topic-tagged utterances 132 stored in DB 106, which correspond to a particular topic. In the example illustrated in FIG. 5, the particular topic is Retirement/RMD. Accordingly, in the example illustrated in FIG. 5, the selected subset of utterances obtained in step S510 would include only a portion of all the utterances that have been tagged with the topic Retirement/RMD from among the topic-tagged utterances 132. For example, the utterances illustrated in FIG. 5 include utterances U3, U4, U5, U6 and Un from among utterances U1-Un included in the topic-tagged utterances 132 illustrated in FIG. 2, where n is a positive integer which may have a value in the millions, or even hundreds of millions or more, depending on a number of communications received from customers at the company associated with the second customer utterance analysis system 200.

Further, the selected subset of utterances obtained in step S510 may include hundreds, thousands or more utterances from among the utterances, of utterances U1-Un from the topic-tagged utterances 132, that are tagged with the topic Retirement/RMD. However, for the purpose of simplicity, only 5 utterances (i.e., U3, U4, U5, U6 and Un) from among the subset of utterances obtained in S510 are illustrated in FIG. 5. According to at least some example embodiments, the subset of utterances obtained in step S510 may be selected randomly from among all the utterances that have been tagged with the topic Retirement/RMD.

In step S520, initial embeddings are obtained. For example, in step S520, the embedding module 410 of the intent prediction module 224 may encode each utterance within the subset of utterances obtained in step S510. According to at least some example embodiments, the embedding module 410 may use GOOGLE's Universal Sentence Encoder to encode each utterance into a 512-dimensional vector. For example, the embedding module 410 may be implemented by GOOGLE's Universal Sentence Encoder as of Sep. 1, 2020. In the example illustrated in FIG. 5, the embedding module 410 generates, as the embeddings of utterances U3, U4, U5, U6, and Un, 512-dimensional vectors V3, V4, V5, V6 and Vn, respectively. Accordingly, the embedding module 410 may obtain an embedding for each utterance within the subset of utterances obtained in step S510, for example in the form of a 512-dimensional vector.

The embedding module 410 is configured to generate the embeddings in such a manner that embeddings with values that are close to each other (i.e., in terms of Hamming distance) correspond to utterances with meanings that are close to each other, and vice versa. For example, by using GOOGLE's Universal Sentence Encoder, the embedding module 410 would generate embeddings for the two utterances "How old are you?" and "What is your age?" such that the embeddings (e.g., the 512-dimensional vectors) have relatively close values because the meanings of the two utterances are essentially the same, despite the use of different words.

In step S530, nonlinear dimensionality reduction is performed. For example, in step S530, the nonlinear dimensionality reduction module 420 of the intent prediction module 224 may use uniform manifold approximation and projection (UMAP) to reduce the dimensionality of the embeddings generated in step S520 with respect to the subset of utterances obtained in step S510. For example, when the embeddings are 512-dimensional vectors, the nonlinear dimensionality reduction module 420 may use UMAP to generate reduced-dimensionality embeddings by reducing the dimensionality of the 512-dimensional vectors obtained in step S520. As an example, the dimensionality of the obtained vectors may be reduced from 512 dimensions to 40-100 dimensions in order to make the obtained vectors (i.e., the obtained embeddings) more suitable for clustering. In the example illustrated in FIG. 5, the nonlinear dimensionality reduction module 420 reduces the dimensionality of the 512-dimensional vectors V3, V4, V5, V6 and Vn to generate reduced-dimensionality vectors RV3, RV4, RV5, RV6 and RVn. According to at least some example embodiments, the number of dimensions included in reduced-dimensionality vectors generated by the nonlinear dimensionality reduction module 420 (i.e., the degree to which the nonlinear dimensionality reduction module 420 reduces the dimensionality of the vectors generated in step S520) is tunable, for example, in accordance with the desires of a designer or operator of the second customer utterance analysis architecture 202 and/or second customer utterance analysis system 200. For example, according to at least some example embodiments, in step S530, the nonlinear dimensionality reduction module 420 may take, as input, a j-dimensional vector and output a k-dimensional vector, where j and k are both integers greater than 2 and k is less than j. According to at least some example embodiments, the degree to which the nonlinear dimensionality reduction module 420 reduces the dimensionality on input vectors may be tuned such that k may be, for example, greater than 50% of j, 50% of j or less, 20% of j or less, or 10% of j or less.

However, the relationship between k and j is not limited to these examples, and may be set in accordance with the desires of a designer or operator of the second customer utterance analysis architecture 202 and/or second customer utterance analysis system 200.

Further, according to at least some example embodiments, by using UMAP to perform the dimensionality reduction, the nonlinear dimensionality reduction module 420 is capable of generating the reduced-dimensionality vectors (e.g., RV3, RV4, RV5, RV6 and RVn) while maintaining the same, or alternatively, substantially the same, distances (i.e., Hamming distances) that originally existed between the corresponding full-dimensionality vectors (e.g., the 512-dimensional vectors V3, V4, V5, V6 and Vn).

In Step S540, clustering is performed. For example, in step S540, the clustering module 430 of the intent prediction module 224 may use a data clustering algorithm to generate clusters with respect to the reduced-dimensionality embeddings (e.g., the 40-100 dimension reduced-dimensionality vectors RV3, RV4, RV5, RV6 and RVn) generated in step S530. According to at least some example embodiments, the data clustering algorithm used in step S540 may be the hierarchical density-based spatial clustering of applications with noise (HDBSCAN) algorithm.

As a result of the clustering, the reduced-dimensionality embeddings (e.g., the reduced-dimensionality vectors RV3, RV4, RV5, RV6 and RVn) generated in step S530, which correspond, respectively, to the subset of utterances obtained in step S510 (e.g., utterances U3, U4, U5, U6, and Un), are arranged in a plurality of clusters. According to at least some example embodiments, in step S540, the clustering module 430 may further generate clusters of utterances by arranging the subset of utterances obtained in step S510 into clusters in accordance with the clusters into which the corresponding reduced-dimensionality embeddings were arranged.

For example, in the example illustrated in FIG. 5:
reduced-dimensionality vectors RV3 and RV4, and thus, corresponding utterances U3 and U4, are assigned to Cluster 0;
reduced-dimensionality vector RV5, and thus, corresponding utterance U5, are assigned to Cluster 1;
reduced-dimensionality vector RV6, and thus, corresponding utterance U6, are assigned to Cluster 2; and
reduced-dimensionality vector RVn, and thus, corresponding utterance Un, are assigned to Cluster 3.

For the purpose of simplicity, only four clusters (i.e., Clusters 0, 1, 2 and 3) are illustrated in the example shown in FIG. 5. However, the clustering module 430 is not limited to creating only four clusters. According to at least some example embodiments, the clustering module 430 can arrange the utterances from the subset of utterances obtained in step S510 into any number of clusters depending on how many utterances are included in the subset and/or the semantic proximity of the utterances included in the subset.

In step S550, domain expert labeling is performed. For example, subject matter experts may review the clusters into which the subset of utterances obtained in step S510 were arranged in step S540, determine which clusters are meaningful, and assign a label to the clusters that are determined to be meaningful. Clusters that are not determined to be meaningful may be ignored. For example, in the example illustrated in FIG. 5, Clusters 0, 1 and 2 are determined by the subject matter experts to be meaningful and cluster 3 is not. Accordingly, the subject matter experts assign labels to Clusters 0, 1 and 2, but not Cluster 3.

The labels assigned by the subject matter experts to the meaningful clusters are intents which the subject matter experts identify based on the utterances included in each meaningful cluster. In the example illustrated in FIG. 5, the subject matter experts assign labels L0, L1 and L2 to Clusters 0, 1 and 2, respectively. According to at least some example embodiments, for each cluster, utterances included in the cluster may be located at one of a plurality of distances from a center of the cluster. Further, according to at least some example embodiments, due to the nature of the data clustering algorithm used in step S540, an utterance that is located closest to a center of a cluster may be considered the utterance that is most representative of the cluster. Accordingly, the subject matter experts can use the most centrally located utterances for each cluster to aid in the process of identifying intents to assign as labels to each of the meaningful clusters. For the purpose of simplicity, Clusters 0, 1 and 2 are illustrated as having one or two utterances each. However, the clusters can include dozens, hundreds or as many as thousands of utterances or more, depending on how large the subset of utterances obtained in step S510 is. As is discussed in greater detail below, the labels assigned to the clusters in step S550 may be used to generate training data for training a neural network model to predict an intent of an utterance in the Training phase.

Training Phase

According to at least some example embodiments, after step S550 of FIG. 5, the labels (i.e., intents) that were assigned, in step S550, to each of the clusters that were determined to be meaningful are provided as input to the training module 440 of the intent prediction module 224. Further, the intent prediction module 224 may generate training data by coupling each assigned label to each utterance included in the cluster to which the label was assigned. For example, the labels (i.e., intents) that were assigned, in step S550, to each of the clusters that were determined to be meaningful in step S550 may be considered, by the intent prediction module 224, to be the labels of the utterances included in each of the clusters for the purposes of using supervised learning to train neural network models to predict intents of utterances, as is discussed in greater detail below with reference to FIGS. 6, 7A and 7B.

Figure 6:
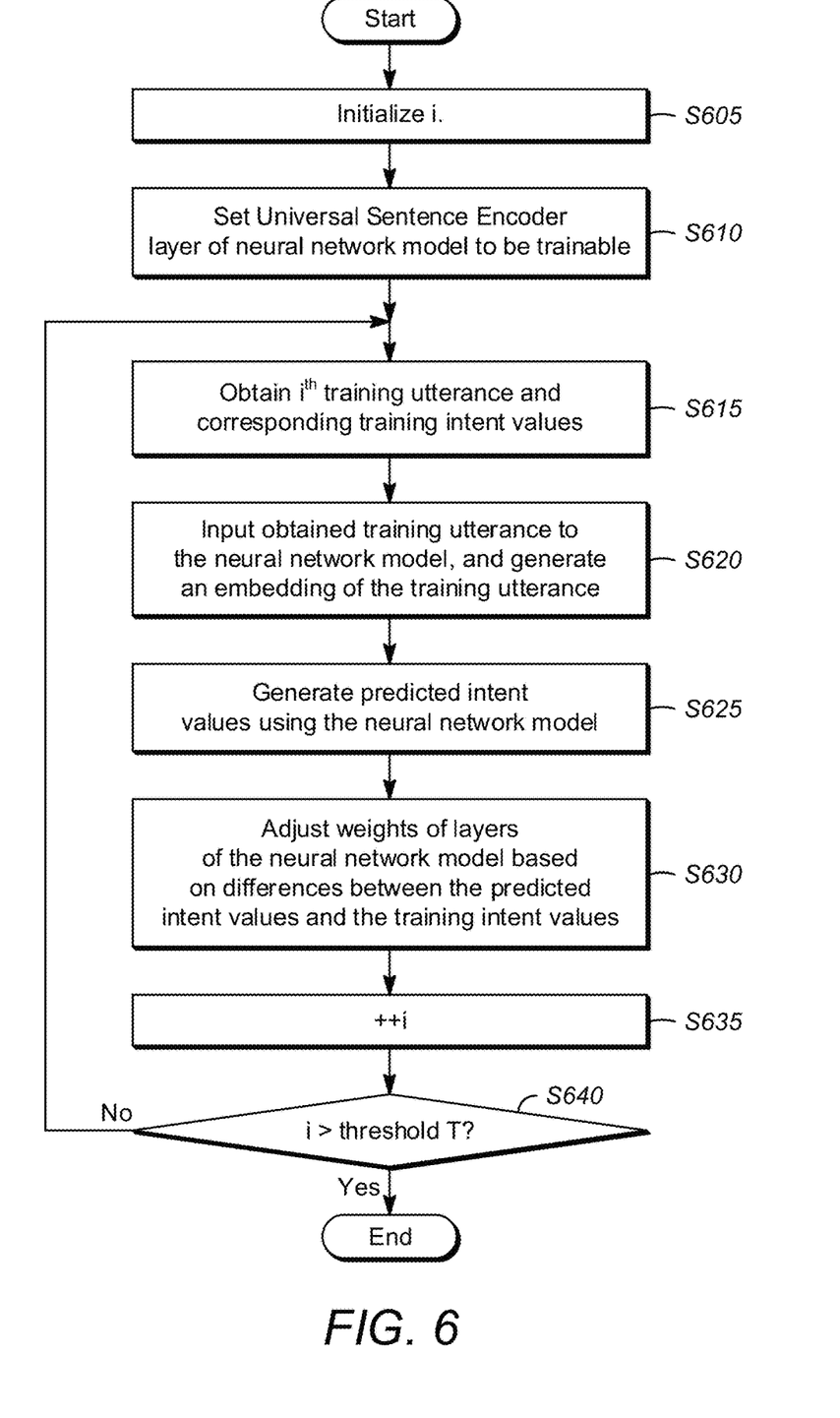
FIG. 6 is a flowchart of a method of training a neural network model to predict an intent of an utterance.
Figure 7A:
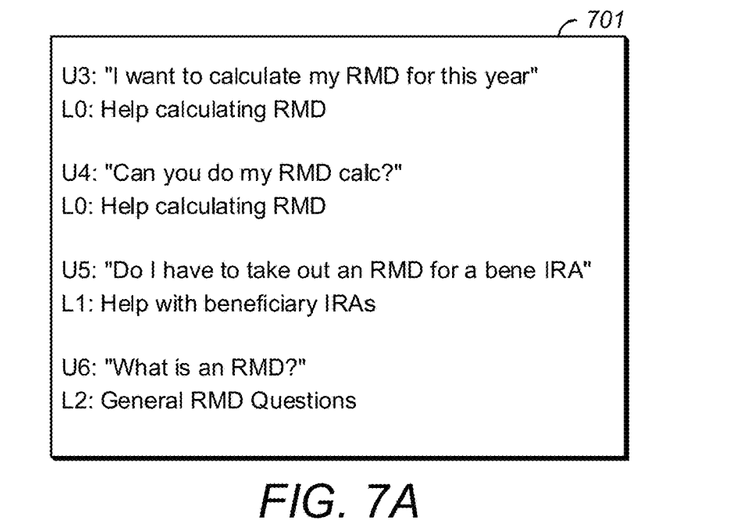
FIG. 7A illustrates examples of labeled utterances according to principles of the present disclosure.

FIG. 6 is a flowchart of a method of training a neural network model to predict an intent of an utterance; FIG. 7A illustrates examples of labeled utterances according to principles of the present disclosure; and FIG. 7B is a diagram illustrating an example neural network models according to principles of the present disclosure.

As is illustrated in FIG. 7A, labeled utterances 701 include utterances U3 and U4 labeled with label L0 corresponding to Cluster 0 shown in FIG. 5, utterance U5 labeled with label L1 corresponding to Cluster 1 shown in FIG. 5, and utterance U6 labeled with label L2 corresponding to Cluster 2 shown in FIG. 5. According to at least some example embodiments, the labeled utterances 701 may be stored, for example, in memory of the intent prediction module 224 or the DB 106.

Figure 7B:
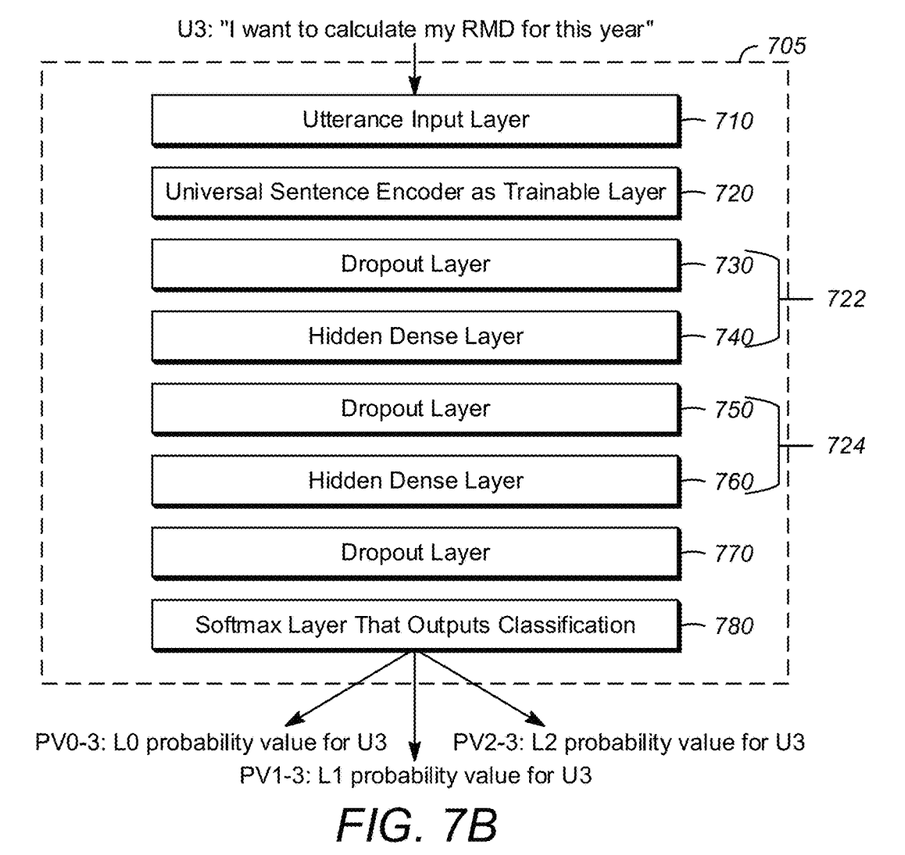
FIG. 7B is a diagram illustrating an example neural network model according to principles of the present disclosure.

Referring to FIG. 7B, neural network model 705 corresponds to a single topic (i.e., the topic Retirement/RMD in the example shown in FIGS. 5-7B). Further, neural network model 705 includes an utterance input layer 710, an encoder layer 720, a first dropout layer/hidden dense layer pair 722 that includes a first dropout layer 730 and a first hidden dense layer 740, a second dropout layer/hidden dense layer pair 724 that includes a second dropout layer 750 and a second hidden dense layer 760, a third dropout layer 770, and an output layer 780. In the example illustrated in FIG. 7B, the encoder layer 720 is implemented by GOOGLE's Universal Sentence Encoder and the output layer 780 is a softmax layer. However, at least some example embodiments are not limited to these examples for the encoder layer 720 and the output layer 780. For example, the encoder layer 720 could be implemented by any known sentence encoder, and the output layer 780 could be implemented by any known output layer. Further, according to at least some example embodiments, the number, order, arrangement and/or composition of layers 720-770 of the neural network model 705 illustrated in FIG. 7B are examples and the neural network model 705 is not limited to these examples. For example, although the neural network model 705 is illustrated as including two dropout layer/hidden dense layer pairs 722 and 724, the neural network model 705 is not limited to this example and may include any number of dropout layer/hidden dense layer pairs. For example, the number of dropout layer/hidden dense layer pairs may be chosen at design time by a designer of the neural network model 705. In various implementations, the number of dropout layer/hidden dense layer pairs may be varied over time. Any change in the number may require a complete re-training. The training operation illustrated in FIG. 6 will now be discussed in greater detail below.

According to at least some example embodiments, the operations of the neural network model training method described below with reference to FIG. 6 may be performed by the intent prediction module 224 (e.g., the training module 440 of FIG. 4) and/or the second customer utterance analysis architecture 202. The neural network model training method of FIG. 6 will be described with reference to a single neural network model that corresponds to a single topic (i.e., neural network model 705 corresponding to the topic Retirement/RMD). However, as was discussed above with reference to FIG. 4, the intent prediction module 224 may include several neural network models corresponding, respectively, to several different topics. Thus, the operations of the neural network model training method of FIG. 6 can be performed for any of the neural network models included in the intent prediction module 224. Further, according to at least some example embodiments, the operations of the neural network model training method of FIG. 6 can be performed simultaneously (i.e., in parallel) with respect to several different neural network models (e.g., neural network model #1-neural network model #N illustrated in FIG. 4).

Returning to FIG. 6, in step S605 a variable i is initialized, for example, to the value 0. In step S610, the encoder layer of the neural network model is set to be trainable. For example, as was noted previously, the encoder layer 720 of the neural network model 705 may be implemented by GOOGLE's Universal Sentence Encoder, in which case the encoder layer 720 would be a pre-trained layer because GOOGLE's Universal Sentence Encoder is an encoder that has already been trained. However, by setting the pre-trained encoder layer 720 to be trainable (as many other layers of the neural network model 705 are set by default, in accordance with known neural network training techniques), the Universal Sentence Encoder within the encoder layer 720 can be fine-tuned to improve its performance specifically with respect to the operation of embedding (i.e., encoding) utterances associated with the topic to which the neural network model 705 corresponds. For example, according to at least some example embodiments, after training is completed for neural network models #1-#N illustrated in FIG. 4, the encoder layers 720 of each neural network model may be fine-tuned differently to perform better or, alternatively, optimally with respect to the different topics to which the neural network models #1-#N correspond, when the encoder layers 720 are set to be trainable. Alternatively, if the encoder layers 720 were not set to be trainable, then each neural network model may have the same encoder layer 720 (e.g., the original Universal Sentence Encoder without fine-tuning) despite corresponding to different topics, and thus, different groups of utterances.

In step S615, the $i^{th}$ training utterance is obtained, for example, from labeled utterances 701. In the example illustrated in FIG. 7B, the $i^{th}$ training utterance is utterance U3.

In step S620, the training utterance obtained in step S615 is input into the neural network model and an embedding of the training utterance is generated. For example, in the example illustrated in FIG. 7B, the utterance U3 is input to the input layer 710 of the neural network model 705, and passed to GOOGLE's Universal Sentence Encoder in the encoder layer 720. As is discussed above with respect to FIG. 5, GOOGLE's Universal Sentence Encoder generates a 512-dimensional vectors. Thus, in step S620, GOOGLE's Universal Sentence Encoder generates a 512-dimensional vector as an embedding of the utterance U3.

In step S625, the neural network model generates predicted intent values. For example, the neural network model 705 may output values indicating a predicted intent of the input utterance U3.

For example, after the 512-dimensional vector is generated by the encoder layer 720 as the embedding of the input utterance U3, layers 730-770 may perform various mathematical operations based on the 512-dimensional vector in accordance with known neural network methods. Further, based on the results of the mathematical operations performed by layers 730-770, the softmax output layer 780 may output, as the predicted intent values, a vector of probability values [PV0-3, PV1-3, PV2-3], where PV0-3 indicates the probability that the intent of utterance U3 is the intent corresponding to label L0, PV1-3 indicates the probability that the intent of utterance U3 is the intent corresponding to label L1, and PV2-3 indicates the probability that the intent of utterance U3 is the intent corresponding to label L2.

According to at least some example embodiments, unlike step S530 of FIG. 5, step S625 does not include a dimensionality reduction operation. Accordingly, the various mathematical operations performed by layers 730-770 are performed based on the full-dimensionality 512-dimensional vector generated in step S620. Thus, the predicted intent values output by the softmax output layer 780 are generated based on the rich set of utterance details captured by the full-dimensionality 512-dimensional vector with respect to the utterance that was encoded into the 512-dimensional vector.

For the purpose of simplicity, FIG. 6 is described with reference to an example scenario in which there are only three possible intents: the intents corresponding to labels L0, L1 and L2, respectively. Thus, the vector of probability values output by the softmax output layer 780 is described with reference to an example in which the vector has only three values (i.e., corresponding to the 3 possible intents). However, the number of possible intents is not limited to 3. The number of possible intents is based on the number of labels identified by the subject matter experts in step S550 of FIG. 5, which is based on the number of clusters identified by the data clustering algorithm in step S540 of FIG. 5.

Returning to FIGS. 6 and 7B, according to at least some example embodiments, the sum of the probability values in the vector output by the softmax output layer 780 is 1.0, and the intent prediction module 224 determines the intent corresponding to the highest probability value, from among the vector of probability values output by the softmax output layer 780, to be the intent predicted for the i$^{th}$ labeled utterance (i.e., the intent predicted for utterance U3).

In step S630, weights of the trainable layers of the neural network model are adjusted based on differences between the predicted intent values output by the neural network model for the i$^{th}$ utterance and the training intent values of the i$^{th}$ utterance. For example, as is shown in the labeled utterances 701 of FIG. 7A, utterance U3 is labeled with label L0. Thus, according to at least some example embodiments, the training intent values of the utterance U3 could be a vector of probability values corresponding the three possible intents, where the probability value for the intent corresponding to label L0 is set to "1" and the probability values for the intents corresponding to the labels L1 and L2 are set to "0": [1,0,0]. Accordingly, based on differences between the predicted intent values [PV0-3, PV1-3, PV2-3] and the training intent values [1,0,0], an error value can be calculated and weights of the trainable layers of the neural network model 705 may be adjusted, for example, in accordance with a known backpropagation algorithm.

In step S635, the index value i is incremented by 1, and in step S640 the index value i as compared to a threshold value T, where T is a positive integer that is set to be equal to a total number of utterances included in the labeled utterances 701 of FIG. 7A. Accordingly, steps S615-S635 are iteratively performed for each labeled utterance and, in the process, weights of the trainable layers of the neural network model 705 (including weights of GOOGLE's Universal Sentence Encoder within the trainable encoder layer 720) are cumulatively adjusted such that the error value calculated during the weight adjustment operation in step S630 is gradually reduced.

According to at least some example embodiments, a portion of the labeled utterances 701 is omitted from the training method of FIG. 6 and is used to perform a validation operation in order to evaluate a current accuracy of the neural network model 705 and determine whether further training is needed based on the results of the evaluation.

Generating Utterance Intent Predictions

Returning to FIGS. 3 and 4, once neural network models #1- #N of the intent prediction module 224 are trained in accordance with the training method illustrated in FIG. 6 and validate, the intent prediction module 224 can generate predicted intents for the topic-tagged utterances 132 and store the predicted intents in the DB 106 as predicted intents of utterances 234.

According to at least some example embodiments, the method by which the intent prediction module 224 generates predicted intents for the topic-tagged utterances 132 may be the same as the training method illustrated in FIG. 6 with the exception that the training-specific steps (e.g., S610 and S630) may be omitted.

Thus, according to at least some example embodiments, the second customer utterance analysis system 200 may generate predicted intents for utterances by obtaining a subset of utterances from among a first plurality of utterances (e.g., step S510 of FIG. 5); encoding, by a sentence encoder, the subset of utterances into a plurality of multi-dimensional (e.g., 512-dimensional) vectors (e.g., step S520 of FIG. 5); generating a plurality of reduced-dimensionality vectors by reducing a dimensionality of the plurality of multi-dimensional vectors (e.g., step S530 of FIG. 5), where each vector from among the plurality of reduced-dimensionality vectors corresponds to a utterance from among the subset of utterances; performing clustering on the plurality of reduced-dimensionality vectors (e.g., step S540 of FIG. 5); based on the clustering performed on the reduced-dimensionality vectors, arranging the subset of utterances into a plurality of clusters; obtaining labels for a least two clusters from among the plurality of clusters (e.g., receiving the labels identified by the subject matter experts in step S550 of FIG. 5); generating training data (e.g., labeled utterances 701 of FIG. 7A) based on the obtained labels; training a neural network model (e.g., neural network model 705 of FIG. 7B) to predict an intent of an utterance based on the training data; inputting utterances into the trained neural network model; and generating, by the trained neural network model, intents corresponding to the input utterances.

Once generated, the company associated with the second customer utterance analysis system 200 may use the predicted intents to identify useful information about the company's customers. For example, the company can use the predicted intents to identify desires, interests, and points of confusion that are most prevalent among the customers, in the aggregate, on a topic-by-topic basis. Further, the company can use this information to make changes that improve the overall quality of the customers' experiences when interacting with the company.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A method of operating a customer utterance analysis system, the method comprising:
   obtaining a subset of multi-word utterances from among a first plurality of multi-word utterances, the first plurality of multi-word utterances including a plurality of multi-word utterances, from among a plurality of topic-tagged multi-word utterances, that are tagged with a first topic, from among a plurality of topics included in a topic set;
   encoding the subset of multi-word utterances into a plurality of multi-dimensional vectors by performing sentence encoding, by a sentence encoder, on each multi-word utterance from among the subset of multi-word utterances;
   generating a plurality of reduced-dimensionality vectors by reducing a dimensionality of the plurality of multi-dimensional vectors,
   each vector from among the plurality of reduced-dimensionality vectors corresponding to a multi-word utterance from among the subset of multi-word utterances;

performing clustering on the plurality of reduced-dimensionality vectors;

based on the clustering performed on the reduced-dimensionality vectors, arranging the subset of multi-word utterances into a plurality of clusters;

obtaining labels for at least two clusters from among the plurality of clusters;

generating first training data based on the obtained labels, the first training data corresponding to the plurality of multi-word utterances tagged with the first topic;

training a first neural network model to predict an intent of a multi-word utterance based on the first training data; and training a second neural network model to predict an intent of a multi-word utterance based on second training data, the second training data corresponding to a second plurality of multi-word utterances, from among the plurality of topic-tagged multi-word utterances, that are tagged with a second topic from among the plurality of topics included in the topic set.

2. The method of claim 1, further comprising:
before the performing of the clustering and the obtaining of the labels,
collecting a second plurality of multi-word utterances from communications received by the customer utterance analysis system from customers; and
generating the plurality of topic-tagged multi-word utterances by,
analyzing the second plurality of multi-word utterances, and
based on the analyzing, tagging each utterance from among the second plurality of multi-word utterances with a topic from among the plurality of topics included in the topic set.

3. The method of claim 1, wherein the plurality of multi-dimensional vectors are j-dimensional vectors and the plurality of reduced-dimensionality vectors are k-dimensional vectors, k being a positive integer greater than 2 and j being a positive integer greater than k.

4. The method of claim 1, wherein the first plurality of multi-word utterances include utterances from at least one of phone conversations, electronic forms, paper forms, electronic surveys, paper surveys, chat app communications, or emails.

5. The method of claim 1, wherein the reducing of the dimensionality of the plurality of multi-dimensional vectors includes using uniform manifold approximation and projection (UMAP) to reduce the dimensionality of the plurality of multi-dimensional vectors.

6. The method of claim 1, wherein the performing of the clustering on the plurality of reduced-dimensionality vectors includes using a hierarchical density-based spatial clustering of applications with noise (HDBSCAN) data clustering algorithm to perform the clustering on the plurality of reduced-dimensionality vectors.

7. The method of claim 1, wherein the generating of the first training data includes, for each cluster from among the at least two clusters for which labels were obtained, coupling the label of the cluster to each utterance included in the cluster.

8. The method of claim 1, wherein:
the first neural network model includes an encoder layer,
the encoder layer includes GOOGLE's Universal Sentence Encoder, and
the training of the first neural network model includes setting the Universal Sentence Encoder to be trainable.

9. A computer system comprising:
memory storing computer-executable instructions and
a processor configured to execute the computer-executable instructions to cause the computer system to perform:
obtaining a subset of multi-word utterances from among a first plurality of multi-word utterances, the first plurality of multi-word utterances being a plurality of multi-word utterances, from among a plurality of topic-tagged multi-word utterances, that are tagged with a first topic, from among a plurality of topics included in a topic set;
encoding the subset of multi-word utterances into a plurality of multi-dimensional vectors by performing sentence encoding, by a sentence encoder, on each multi-word utterance from among the subset of multi-word utterances;
generating a plurality of reduced-dimensionality vectors by reducing a dimensionality of the plurality of multi-dimensional vectors, wherein each vector from among the plurality of reduced-dimensionality vectors corresponds to a multi-word utterance from among the subset of multi-word utterances;
performing clustering on the plurality of reduced-dimensionality vectors;
based on the clustering performed on the reduced-dimensionality vectors, arranging the subset of multi-word utterances into a plurality of clusters;
obtaining labels for at least two clusters from among the plurality of clusters;
generating first training data based on the obtained labels, the first training data corresponding to the plurality of multi-word utterances tagged with the first topic;
training a first neural network model to predict an intent of a multi-word utterance based on the first training data; and
training a second neural network model to predict an intent of a multi-word utterance based on second training data, the second training data corresponding to a second plurality of multi-word utterances, from among the plurality of topic-tagged multi-word utterances, that are tagged with a second topic from among the plurality of topics included in the topic set.

10. The computer system of claim 9, wherein the computer-executable instructions, when executed by the processor, further cause the computer system to perform:
before the performing of the clustering and the obtaining of the labels, collecting a second plurality of multi-word utterances from communications received from customers; and
generating the plurality of topic-tagged multi-word utterances by,
analyzing the second plurality of multi-word utterances, and
based on the analyzing, tagging each utterance from among the second plurality of multi-word utterances with a topic from among the plurality of topics included in the topic set.

11. The computer system of claim 9, wherein:
the plurality of multi-dimensional vectors are j-dimensional vectors;
the plurality of reduced-dimensionality vectors are k-dimensional vectors;
k is a positive integer greater than 2; and
j is a positive integer greater than k.

12. The computer system of claim 9, wherein the first plurality of multi-word utterances include multi-word utterances from at least one of phone conversations, electronic forms, paper forms, electronic surveys, paper surveys, chat app communications, or emails.

13. The computer system of claim 9, wherein the reducing of the dimensionality of the plurality of multi-dimensional vectors includes using uniform manifold approximation and projection (UMAP) to reduce the dimensionality of the plurality of multi-dimensional vectors.

14. The computer system of claim 9, wherein the performing of the clustering on the plurality of reduced-dimensionality vectors includes using a hierarchical density-based spatial clustering of applications with noise (HDBSCAN) data clustering algorithm to perform the clustering on the plurality of reduced-dimensionality vectors.

15. The computer system of claim 9, wherein the generating of the first training data includes, for each cluster from among the at least two clusters for which labels were obtained, coupling the label of the cluster to each utterance included in the cluster.

16. The computer system of claim 9, wherein:
the first neural network model includes an encoder layer,
the encoder layer includes GOOGLE's Universal Sentence Encoder, and
the training of the first neural network model includes setting the Universal Sentence Encoder to be trainable.

17. A method of operating a customer utterance analysis system, the method comprising:
collecting a first plurality of multi-word utterances;
generating a plurality of topic-tagged multi-word utterances by,
analyzing the first plurality of multi-word utterances, and
based on the analyzing, tagging each multi-word utterance with a topic from among a plurality of topics included in a topic set, the topic set including at least a first topic and a second topic,
the plurality of topic-tagged multi-word utterances including at least first-topic multi-word utterances tagged with the first topic and second-topic multi-word utterances tagged with the second topic;
generating a plurality of first-topic multi-dimensional vectors by performing sentence encoding, by a sentence encoder, on a subset of the first-topic multi-word utterances;
generating a plurality of second-topic multi-dimensional vectors by performing sentence encoding, by a sentence encoder, on a subset of the second-topic multi-word utterances;
obtaining first labels for the first-topic multi-word utterances based on the plurality of first-topic multi-dimensional vectors;
generating first training data corresponding to the first topic based on the obtained first labels;
training a first neural network model to predict an intent of a multi-word utterance based on the first training data;
obtaining second labels for the second-topic multi-word utterances based on the plurality of first-topic multi-dimensional vectors;
generating second training data corresponding to the second topic based on the obtained second labels; and
training a second neural network model to predict an intent of a multi-word utterance based on the second training data.

18. The method of claim 17, wherein the obtaining of the first labels comprises:

generating a plurality of first reduced-dimensionality vectors by reducing a dimensionality of the plurality of first-topic multi-dimensional vectors,
each vector from among the plurality of first reduced-dimensionality vectors corresponding to a multi-word utterance from among the first-topic multi-word utterances;
performing clustering on the plurality of first reduced-dimensionality vectors;
based on the clustering performed on the first reduced-dimensionality vectors, arranging the first-topic multi-word utterances into a first plurality of clusters; and
obtaining, as the first labels, labels for at least two clusters from among the first plurality of clusters.

19. The method of claim 18, wherein the obtaining of the second labels comprises:
generating a plurality of second reduced-dimensionality vectors by reducing a dimensionality of the plurality of second-topic multi-dimensional vectors,
each vector from among the plurality of second reduced-dimensionality vectors corresponding to a multi-word utterance from among the second-topic multi-word utterances;
performing clustering on the plurality of second reduced-dimensionality vectors;
based on the clustering performed on the second reduced-dimensionality vectors, arranging the second-topic multi-word utterances into a second plurality of clusters; and
obtaining, as the second labels, labels for at least two clusters from among the second plurality of clusters.

20. A computer system comprising:
memory storing computer-executable instructions and
a processor configured to execute the computer-executable instructions, wherein the computer-executable instructions include:
collecting a first plurality of multi-word utterances;
generating a plurality of topic-tagged multi-word utterances by,
analyzing the first plurality of multi-word utterances, and
based on the analyzing, tagging each multi-word utterance with a topic from among a plurality of topics included in a topic set, the topic set including at least a first topic and a second topic,
the plurality of topic-tagged multi-word utterances including at least first-topic multi-word utterances tagged with the first topic and second-topic multi-word utterances tagged with the second topic;
generating a plurality of first-topic multi-dimensional vectors by performing sentence encoding, by a sentence encoder, on a subset of the first-topic multi-word utterances;
generating a plurality of second-topic multi-dimensional vectors by performing sentence encoding, by a sentence encoder, on a subset of the second-topic multi-word utterances;
obtaining first labels for the first-topic multi-word utterances based on the plurality of first-topic multi-dimensional vectors;
generating first training data corresponding to the first topic based on the obtained first labels;
training a first neural network model to predict an intent of a multi-word utterance based on the first training data;

obtaining second labels for the second-topic multi-word utterances based on the plurality of first-topic multi-dimensional vectors;

generating second training data corresponding to the second topic based on the obtained second labels; and training a second neural network model to predict an intent of a multi-word utterance based on the second training data.

21. The computer system of claim 20, wherein the obtaining of the first labels comprises:

generating a plurality of first reduced-dimensionality vectors by reducing a dimensionality of the plurality of first-topic multi-dimensional vectors, each vector from among the plurality of first reduced-dimensionality vectors corresponding to a multi-word utterance from among the first-topic multi-word utterances;

performing clustering on the plurality of first reduced-dimensionality vectors;

based on the clustering performed on the first reduced-dimensionality vectors, arranging the first-topic multi-word utterances into a first plurality of clusters; and obtaining, as the first labels, labels for at least two clusters from among the first plurality of clusters.

22. The computer system of claim 20, wherein the obtaining of the second labels comprises:

generating a plurality of second reduced-dimensionality vectors by reducing a dimensionality of the plurality of second-topic multi-dimensional vectors, each vector from among the plurality of second reduced-dimensionality vectors corresponding to a multi-word utterance from among the second-topic multi-word utterances;

performing clustering on the plurality of second reduced-dimensionality vectors;

based on the clustering performed on the second reduced-dimensionality vectors, arranging the second-topic multi-word utterances into a second plurality of clusters; and obtaining, as the second labels, labels for at least two clusters from among the second plurality of clusters.

* * * * *